United States Patent
Ozceri et al.

(10) Patent No.: US 8,140,813 B2
(45) Date of Patent: Mar. 20, 2012

(54) ENDLESS MEMORY

(75) Inventors: Berend Ozceri, Sunnyvale, CA (US);
Eugene M. Feinberg, Sunnyvale, CA (US)

(73) Assignee: Eye-Fi, Inc., Mountain View, CA (US)

( * ) Notice: Subject to any disclaimer, the term of this patent is extended or adjusted under 35 U.S.C. 154(b) by 0 days.

(21) Appl. No.: 13/040,638

(22) Filed: Mar. 4, 2011

(65) Prior Publication Data

US 2011/0153962 A1     Jun. 23, 2011

Related U.S. Application Data (60) Continuation-in-part of application No. 12/749,485, filed on Mar. 29, 2010, now Pat. No. 8,046,504, which is a division of application No. 11/468,251, filed on Aug. 29, 2006, now Pat. No. 7,702,821.

(60) Provisional application No. 60/718,155, filed on Sep. 15, 2005, provisional application No. 61/311,138, filed on Mar. 5, 2010.

(51) Int. Cl.
*G06F 13/12*     (2006.01)

(52) U.S. Cl. .............. 711/170; 710/52; 710/56; 710/57; 711/115; 711/147; 711/154; 711/159

(58) Field of Classification Search .................... 710/52, 710/56, 57; 711/115, 147, 154, 159
See application file for complete search history.

(56) References Cited

U.S. PATENT DOCUMENTS

| | | | |
|---|---|---|---|
| 7,783,845 B2 * | 8/2010 | Bennett et al. | 711/159 |
| 7,831,783 B2 * | 11/2010 | Pandit et al. | 711/159 |
| 7,917,709 B2 * | 3/2011 | Gorobets | 711/154 |
| 2004/0186975 A1 * | 9/2004 | Saha | 711/170 |
| 2004/0205311 A1 * | 10/2004 | Hulsey | 711/162 |
| 2006/0112246 A1 * | 5/2006 | Boning | 711/163 |
| 2011/0035562 A1 * | 2/2011 | Gaither | 711/162 |
| 2011/0082966 A1 * | 4/2011 | Yu et al. | 711/103 |

* cited by examiner

*Primary Examiner* — Ilwoo Park
*Assistant Examiner* — Jasjit Vidwan
(74) *Attorney, Agent, or Firm* — SNR Denton US LLP

(57) ABSTRACT

A storage device includes a controller that is configured to execute safe deletion operations so as to free up storage space on the device in response to triggering events. The safe deletion operations ensure that the data states of a host device making use of the storage device and the storage device itself are synchronized so as to prevent deletion of data from the storage device before it is offloaded to another storage platform.

20 Claims, 5 Drawing Sheets

ENDLESS MEMORY

RELATED APPLICATIONS

This is (i) a NONPROVISIONAL of U.S. Provisional Patent Application No. 61/311,138, filed 5 Mar. 2010, which is incorporated by reference, and (ii) a CONTINUATION-IN-PART of U.S. patent application Ser. No. 12/749,485, filed 29 Mar. 2010 now U.S. Pat. No. 8,046,504, which is a DIVISIONAL of U.S. patent application Ser. No. 11/468,251, filed 29 Aug. 2006, now U.S. Pat. No. 7,702,821, which claims priority to U.S. Provisional Patent Application 60/718,155, filed 15 Sep. 2005; all of which are assigned to the assignee of the present invention.

FIELD OF THE INVENTION

The present invention relates to storage devices and, more particularly, to methods and systems for a storage device controller to delete content from storage media of such storage devices so as to provide free storage space for new content, without explicit coordination of a host device.

BACKGROUND

Devices such as digital still cameras ("DSCs") rely on removable, non-volatile media cards to store image and other data (e.g., metadata concerning the image data). Other digital media devices such as audio/video recorders/players (e.g., mobile phones, personal digital assistants, MP3 players, digital video cameras, portable computers, etc.) also use such media cards to store a variety of digital media (e.g. images, movies, audio, etc.). Several media card formats exist, including Secure Digital (SD). Multi Media Card (MMC), Compact Flash (CF) I and II, Memory Stick (MS), and xD Picture Card (xD). As used herein, the term media card is intended to refer to all such digital media storage devices, regardless of physical format.

Generally, extracting images or other data from these media cards requires a tethered connection to a personal computer (or similar device) or printer. For example, images can be downloaded directly to hard copy using printers that support physical interfaces compatible with the media card. Alternatively, images may be uploaded to personal computers via card readers or wired connections between the cameras hosting the media cards and the computers.

More recently, digital cameras having wireless network connectivity have become available. These cameras permit connectivity with wireless networks (usually such networks as are compliant with the IEEE 802.11a/b/g, etc. standards) to transfer image data from the media card to a personal computer or printer. However, such cameras are generally more expensive than non-wireless network capable DSCs and, given the present installed base of non-wireless network capable DSCs, represent only a very small portion of the overall number of DSCs available today.

SUMMARY OF THE INVENTION

Described herein are methods and systems for a storage device controller to delete content from storage media of such storage devices so as to provide free storage space for new content, without explicit coordination of a host device.

In one embodiment, a controller of a storage device that includes a host device interface and a storage media is configured to, upon detecting a triggering event, enumerate a list of files that are candidates for deletion from the storage media, and record a list of sectors of the storage media used to store the candidate files; mark storage device file system directory entries for the list of enumerated files as deleted while locking out a host device coupled to the host device interface from accessing the storage media, and perform a read/modify/write sequence of those sectors of the storage media holding the directory entries; wait for a first host device synchronization event, and upon recognizing the first host device synchronization event check the list of candidate files for deletion and determining whether corresponding directory entries of the candidate files are marked deleted; if the directory entries of the candidate files are not marked deleted, repeat the marking of directory entries as deleted, perform the read/modify/write of the sectors of the storage media holding the directory entries, and wait for an additional first host device synchronization event; otherwise, if the directory entries of the candidate files are marked deleted, then mark orphaned sectors to prevent data storage to corresponding data storage units in the storage media but maintain the orphaned sectors in the list of sectors, wherein the orphaned sectors are those sectors with corresponding directory entries that are marked as deleted but with corresponding data storage units in the storage media still allocated; wait for a further host device synchronization event and, upon recognizing same, iterate through the orphaned sectors to determine whether or not the host device subsequently wrote over the read/modify/write actions; and if the orphaned sectors have reverted to a previous value, then repeat the marking of the orphaned sectors, wait for the further host device synchronization event and determine whether or not the host device subsequently wrote over the read/modify/write actions, otherwise, if the orphaned sectors are still marked, allocate the list of sectors as being available to store new data and clear the list of candidate files.

These and further embodiments of the invention are discussed in greater detail below, with reference to the accompanying drawings.

BRIEF DESCRIPTION OF THE DRAWINGS

The present invention is illustrated by way of example, and not limitation, in the figures of the accompanying drawings, in which.

DETAILED DESCRIPTION

In U.S. Patent Application Publication 2007/0073937, a content-aware, digital media storage device capable of replacing or substituting for conventional media cards in legacy devices, such as DSCs and other digital media devices, was described. That digital media storage device included radio frequency circuitry to permit wireless communications between the digital media storage device and a compatible transmitter/receiver/transceiver. The storage device also included a flash memory array and a controller configured to execute computer-readable instructions with flash memory array-facing and host-facing physical layer interface logic. In this context, the "host" being referred to is the device (e.g., the camera, audio player or other host device) which will use the digital media storage device as a repository for digital data (e.g., images, audio files, and the like). The controller executes the computer-readable instructions to proxy accesses from the host-facing physical layer interface of the storage device (i.e. the interface with the DSC or other digital device) to the flash memory array and to offload digital data stored in the flash memory array to a remote computer system, in the latter case via the RF circuitry. In this way, digital images and their associated metadata can be wirelessly transferred from the storage device to a digital photo album or the like without having to remove the storage device from the host camera or having to use a wired communication link between the host camera and a computer system. It was also noted that the stored images could be automatically deleted from the media card as soon as they had been successfully transferred to the digital photo album or remote computer system. Described herein are methods and systems to facilitate such autonomous deletion. Note that although the remainder of the discussion will concern media cards having flash memory storage media, the present invention is applicable to any storage device having any form of storage media (e.g., a magnetic or optical disc, solid state storage media or other form of storage media). Hence, the flash memory examples provided herein are not intended to limit the scope of the present invention.

Figure 1:
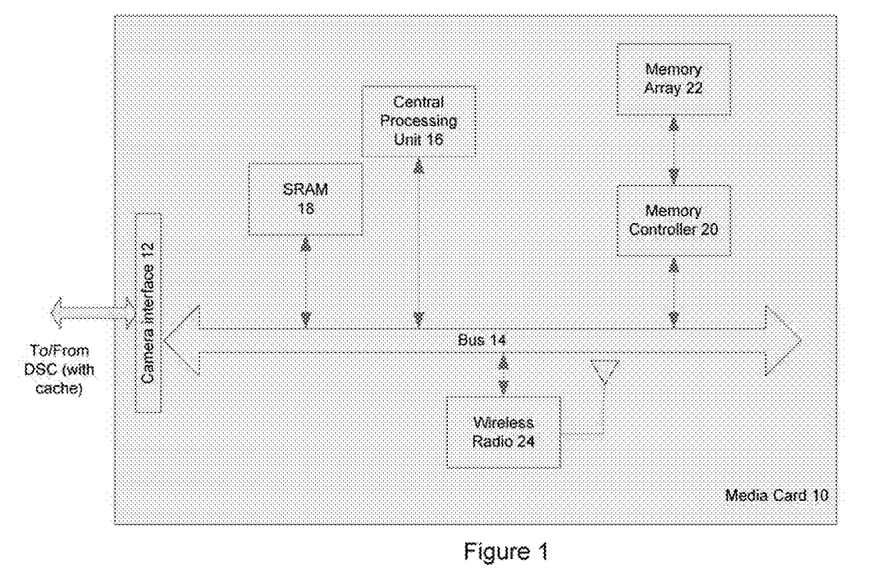
FIG. 1 illustrates an example of a digital media storage device in the format of a media card configured in accordance with an embodiment of the present invention.

FIG. 1 illustrates an example of a digital media storage device in the format of a media card 10 configured in accordance with an embodiment of the present invention. As illustrated, media card 10 includes an interface 12 for communication with a host (e.g. a DSC or other digital device). The physical and electrical make up of interface 12 will depend on the type of media card used (e.g., SD, MMC, CF I, CF II, MS, xD, etc.) but such interfaces are well known in the industry and need not be described in detail. Stated differently, such an interface is entirely conventional in nature and conforms to the relevant industry specifications therefor, depending on the type of media card being used.

The host interface 12 is coupled to a bus 14 which is used for communicating electrical signals within the media card 10. In some cases bus 14 may be a dedicated bus between the interface 12 and a central processing unit (CPU) 16, while in other cases it may be a more general bus used for communications between the CPU and other components as well. As with interface 12, the CPU 16 (which is communicatively coupled to bus 14) is a conventional feature of such media cards. In some embodiments a read/write memory (such as an SRAM) 18 may be used. This provides a convenient storage location for CPU 16 when performing computations and the like. SRAM 18 may be communicatively coupled to bus 14 (as shown) or may be communicatively coupled directly to CPU 16 through a private interface (e.g. a separate memory bus).

A memory controller 20 and associated memory array 22 are also present and the controller 20 is communicatively coupled to bus 14 and to the array 22. In the illustration a flash memory array and flash memory controller are shown, however, other storage media and associated controllers may be used. For example, a relatively new form of storage device incorporates a mini hard drive and associated controller within a physical format compatible with conventional CF-II media cards. Such storage devices may be used in connection with the present invention, which is storage format-agnostic.

Also included in media card 10 is a wireless radio transceiver 24, which may be communicatively coupled to bus 14 so as to communicate with CPU 16. The wireless radio 24 is an example of the peripherals discussed above and in this embodiment preferably conforms to the IEEE 802.11 a/b/g, etc. specifications, but in other embodiments other forms of wireless radios or even other peripherals may be used. For example, wireless radios conforming to the Bluetooth™ and/or GPS specifications may be used. Alternatively, or in addition, wireless radios conforming to the IEEE 802.16 standards may be used. The precise nature of the peripheral port is not critical to the present invention, though in several of the applications described below a peripheral device that provides wireless communications for media card 10 is required.

In this example, the physical dimensions of the media card 10 are compatible with existing media card interfaces of various hosts, such as DSCs and the like. In the past, media cards with wireless network functionality have been larger than their non-wireless capable counterparts. DSCs (and other digital devices) usually (or often) enclose their media cards in the body of the host device. As a result, the larger, wireless-capable media cards were incompatible with many existing host devices. In various embodiments, however, the present media card 10 is sized so as to fit within legacy host media card housings.

Other incompatibility problems which have prevented the use of media cards with wireless functionalities with various hosts are even more difficult to overcome. For example, prior media cards that have incorporated flash memory with wireless network capabilities have required the host device to support them with appropriate software drivers, making them incompatible with existing and legacy hosts. That is, existing hosts simply do not contain the firmware needed to operate with previously available media cards having these functionalities. In contrast, the present media cards are "self-hosted", meaning that they require no such firmware support from the host device. Instead, the present media cards themselves act as a host device with an onboard network interface but present to the camera or other digital device with which the card is being used as a conventional block storage device. This means that the firmware used by existing and legacy host devices need not be altered in order to read and write images, audio files or other digital content, and metadata, to/from the present media cards.

In addition, a portion of the memory array 22 may be reserved for storing the upload status information for images being transferred off of the media card. For example, in the case of a media card with a wireless radio that is used in connection with uploading digital images, maintaining information regarding the status of any such uploads over the wireless network may be important so that in cases where such transfers are interrupted, they can be resumed from a proper starting point once communications with the wireless network have been reestablished. Further, maintaining such status information will also provide the media card with the ability to determine when the original images can safely be removed from the media card memory array. Of course, the upload status may also be stored on the network side, either in addition to or instead of being stored on the media card.

Storing the information both "on card" and on a remote computer system would allow for graceful handling of transmission interruptions.

Figure 2:
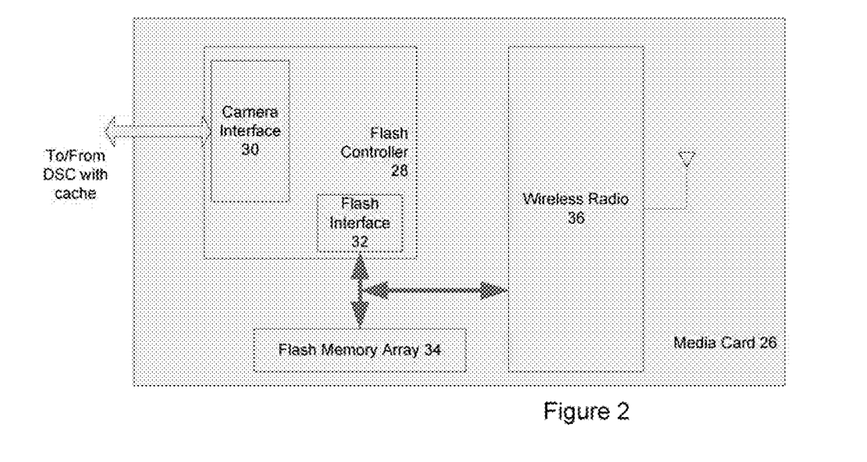
FIG. 2 illustrates a media card configured in accordance with an alternative embodiment of the present invention.

FIG. 2 illustrates a media card 26 configured in accordance with an alternative embodiment of the present invention. In this media card 26, a flash memory controller 28 includes a host interface 30, for example an SD or CF-I/CF-II interface. Controller 28 also includes a flash array interface 32 which is communicably connected to the flash memory array 34. In this example a NAND flash memory array is used, however, in other embodiments a NOR flash memory array may be used.

The media card 26 also includes a wireless radio 36, which is communicably coupled to the flash controller 28 and the memory array 34. The wireless radio 36 may be a self-contained 802.11 a/b/g, etc. compliant communication device that includes both a media access controller, a RISC processor (with it attendant read/write memory and flash memory for storing intermediate results and computer-readable instructions, respectively) and the wireless radio front end. The wireless nature of the secondary interface (the interface with the host device is considered the primary interface for the media card) allows digital content (e.g., images) to be transferred onto or off of the media card while still enclosed within the host's media card slot. Working from within the media slot allows the media card to draw power from the host device, eliminating the need for an integral battery. It is also possible to operate the media card and its wireless interface outside of the host, provided power is supplied via the host interface (12, 30), or alternatively, in an embodiment that integrates a battery onto the media card. As indicated above, to enable wireless transfer functionality the present media card adds a wireless radio (e.g., an IEEE 802.11 a/b/g, etc. radio or Bluetooth radio, etc.), a media access controller (MAC), and an embedded host CPU to the conventional flash controller functionality. Software components for interpreting the host's file system and data stored in the memory array, connecting to local area and/or other networks (e.g. via TCP/IP protocols) and managing low-level driver tasks of the wireless interface hardware are all included for use by the embedded host CPU.

As discussed, media cards configured in accordance with present invention can be used in connection with a variety of devices, such as DSCs, digital video cameras, mobile phones, personal computers, personal digital assistants, and similar devices. Much of the discussion below will focus on the use of such media cards with DSCs and further details of the firmware operation for the specific instance of a DSC writing image data to a digital media storage device configured in accordance with the present invention are presented below. However, it should be remembered that this is being done only so as to provide an example of the present invention. The overall scope of the invention is reflected in the claims following this description and that scope should not be unnecessarily limited in view of the DSC examples presented herein.

Media cards that integrate a storage device with a wireless communication system in accordance with the present invention may be compliant with any existing media card format (e.g., SD, MMC, CF, MS, or xD) so as to be compatible with a wide variety of DSCs and other hosts. In the case of a camera host, having an integrated wireless communication device allows users to upload images (or other data) from the camera (i.e., the media card) to an alternative device (e.g., a personal computer, a server or storage location associated with a local area network, or an Internet-based computer/storage resource, etc.) at the time the image is captured (if wireless communications are available) or at a later time, without having to tether the camera or the media card to a physical interface (e.g., such as a universal serial bus (USB) cable or other interface). In the case where images are uploaded to an Internet-based computer/storage resource, those images can be managed through any conventional Web browser, either using a personal computer, television and set-top box combination, mobile phone, or similar communication device.

Having thus described various media cards configured in accordance with the present invention, we turn now to a discussion of how digital data is written to and deleted from the storage media.

Unlike a conventional flash controller, the present controller and associated firmware make digital media storage devices configured in accordance with the present invention capable of interpreting and processing the data stored in the flash array. The present firmware uses the file system structure written to the flash array to "mount" the device (before a computer can use any kind of storage media the operating system must make that media accessible through the computer's file system—a process known as mounting), obtain an inventory of files stored thereon, read the contents of those files, and (if desired) make modifications to the file system. Such modifications include, but are not limited to removing and renaming files, updating file attributes, and creating new files. This is in distinct contrast to conventional flash array controllers, which merely stage the information being written to the storage array in the form of fixed-size blocks of opaque data and take the appropriate actions to write the blocks to the array.

Figure 3:
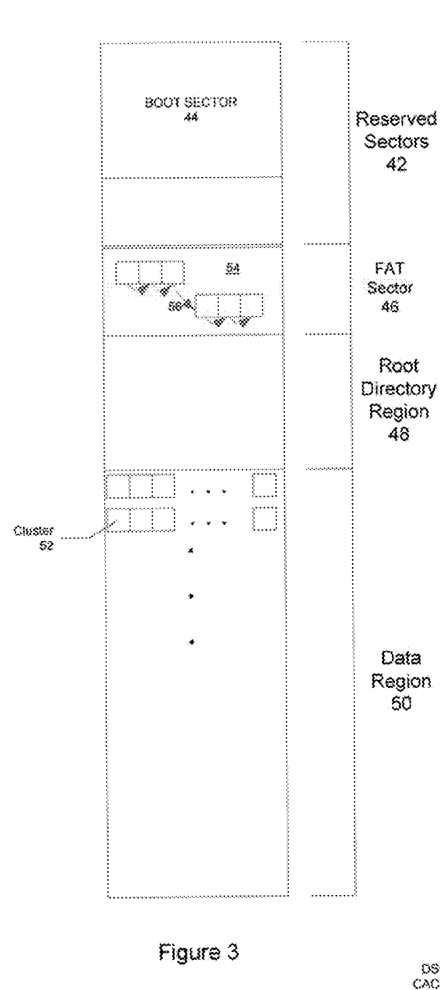
FIG. 3 illustrates the structure of a formatted storage device in accordance with an embodiment of the present invention.

In one embodiment then, the present digital media storage device interrupts the external host from directly addressing the flash array. Instead, all accesses by the host device are proxied and translated by the firmware before resolving to a specific block of data in the flash array. The digital media storage device may be readied for such activities by first formatting the device (e.g. in the conventional fashion), if necessary, and then initializing an internal mapping table to directly map all the blocks that have been written during the format operation and un-mapping all other blocks in the array. As a result, after the operation is completed, only data blocks that contain file system metadata such as the File Allocation Table (FAT), Root Directory Structure and Partition Boot Record have a valid translation from logical block addresses presented at the host interface to physical addresses within the digital media storage device. All other blocks are considered unused and unallocated and are not directly accessible by the host device. The structure of such a formatted storage device is shown in FIG. 3.

As shown, the FAT file system 40 has four sections. First are a number of reserved sectors 42, including the Boot Sector (a.k.a. Partition Boot Record). The reserved sectors include areas for basic file system information and pointers to the location of the other sections. Next is the FAT sector 46, which contains the actual File Allocation Table 54. This is essentially a map of the Data Region, indicating which clusters are used by files and directories. Next, the Root Directory Region 48 provides a Directory Table that stores information about the files and directories located in the root directory. In some cases, the Root Directory Region is stored in the Data Region 50, along with files and other directories, allowing it to grow without such a constraint. Finally, the Data Region stores the actual file and directory (and, in some cases, sub-directory) data. The size of files and directories can be increased arbitrarily (as long as there are free clusters) by simply adding more links 56 to the file's chain in the FAT. Note however, that files are allocated in units of clusters 52.

From this initialized state, the digital media storage device maintains persistent databases of free physical blocks within the flash array and logical-to-physical mappings for allocated blocks. In one embodiment, block accesses from external hosts may be intercepted in the following manner:

1) If a block read is requested by the external host and there exists a logical-to-physical mapping for that block address, the corresponding block of data is read from the flash array and returned to the host.
2) If a block read is requested by the external host, but there exists no logical-to-physical mapping for that block address, the digital media storage device fabricates a block data read response of all zeros (or other response) and returns the data to the external host. The flash array is not accessed, nor is any new storage or mapping allocated.
3) If a block write is requested by the external host and there exists a logical-to-physical mapping for that block address, the data provided by the host is written into the flash array at the corresponding physical address.
4) If a block write is requested by the external host, but no existing logical-to-physical mapping for that block address is present, a currently unmapped physical block is taken from the digital media storage device's internal persistent database of free physical blocks and a new mapping is created from the block address provided by the host to the physical address of the allocated block. The data provided by the host is then written to the flash array at that physical address. If no free physical blocks are available, a block-level device access error is returned to the host.

This dynamically-allocated logical-to-physical block address mapping scheme allows the present digital media storage device to reorganize the data in its flash memory array without external, host-visible side-effects. Furthermore, augmented by the firmware's understanding of higher-level FAT file system semantics, it allows the present storage device to manipulate the contents of files or folders stored in the flash array, without any explicit cooperation or synchronization from the external host device's software. Stated differently, the advantages afforded by the present invention (e.g. the ability to manipulate the data stored in the flash array) require no change to the physical host's existing firmware or application-level software.

To better appreciate the access controls provided in accordance with embodiments of the present invention, it is appropriate to review some underlying characteristics of conventional removable media and host devices. Most DSCs available today employ non-volatile storage devices inserted into their "digital film" slots. These non-volatile storage devices use a "FAT" or file allocation table format to store images captured by the DSC. The FAT file system has its origins in MS-DOS, and several variants are in use (e.g., FAT-16 and FAT-32). FAT is specified for use in digital cameras as part of the JEITA CP-3461 standard, better known as DCF 2.0. In addition to the file system, DCF 2.0 (Sections 3.2 and 5) specifies a directory hierarchy as well as directory and file naming conventions that are a subset of FAT's 8+3 naming scheme.

Before storing images into a storage device (e.g., a flash memory of a media card), the DSC will determine whether the device has been formatted in accordance with the DCF specification. If not, the camera will prepare the memory device to store data in an organized fashion through a process called "formatting." Formatting logically erases all existing data stored in the memory device and writes an empty file system structure in the FAT format. The camera's FAT software writes an empty File Allocation Table, which marks all data clusters to be available for storing new files into. An empty folder structure is written by initializing an empty Root Directory Structure. The camera will then create new folders, in accordance with processes outlined in the DCF specification, to provide logical separation of images stored into the memory device (e.g., folders for different cameras that the memory device may be used in concurrently, for different dates that the user takes pictures on, etc.).

JEITA CP-3451 "Exchangeable image file format for digital still cameras", better known as EXIF, is a companion to the DCF specification. EXIF specifies image, sound, and tag formats for storage within the file system structure mandated by DCF. For example, and as alluded to above. EXIF tags for "artist" (i.e., photographer) information and/or date/time information can be used. The photographer information can be gathered from user-provided account information. In addition, time zone references can be added in accordance with the present invention by using GPS data to determine the corresponding time zone and writing such information and/or an absolute time into a UTC-referenced GPSDateStamp field. In addition, the information regarding peers (e.g., other users/DSCs present at or near the location of a DSC having a media card configured in accordance with the present invention) can be written to the MakerNote tag. As with location metadata, processing of such information can be performed in the media card, in the server layer or in a combination of these devices.

EXIF specifies the use of JPEG, known formally as ISO-IEC 10918-1/ITU-T Recommendation T.81, for compressed images, and Adobe TIFF 6.0 for uncompressed images. Images of either format are annotated with TIFF-style tags, recording camera and image parameters. The WAV format is specified for audio annotations, which are to be associated with captured images.

In order to take advantage of the non-volatile storage medium, it is expected that a camera will flush metadata as well as data block updates to the flash at the end of each operation. Nonetheless, it is possible for a camera implementation to cache some or all of the FAT file system metadata, relying on a write-through cache discipline to keep the flash storage in sync. As a result, updates to the metadata performed by the media card may not be observed until the camera is next powered up, or whenever the metadata cache is refreshed.

FAT file attributes can be used to mark a file read-only. DCF 2.0 (Section 5.2.2.4) specifies support for the Read Only attribute to prevent accidental deletion (though some DSCs may not respect this attribute). Some cameras allow toggling of the Read Only attribute (often represented as a key icon on the preview screen).

When an image is taken, a file is created within the file system by the camera, after which the sequence of digital data encoding the image is stored in the file (note, in some instances this sequence is reversed, and either is acceptable). The data is usually formatted in a conventional compressed image format (such as JPEG), as specified by DCF. In order to complete the action of creating the file and storing the image data, the camera must go through the following set of actions (assuming there is free space available on the device), although not necessarily in this exact order:

1) Starting with the Root Directory Region of the file system, traverse the file system blocks representing the directory hierarchy stored on the device to find the Directory Table block for the directory (folder) into which the new image is to be stored.
2) Add an entry to that Directory Table block describing the new file being created. This contains information about the name of the file and where within the file system the beginning of the data (i.e. the first data block) for that file resides.

3) Find a free data cluster based on the information stored in the File Allocation Table. Mark that data cluster as being used and store the a cluster's worth of image data in the continuous range of blocks representing the cluster (FAT allows the cluster size to be configured at the time the file system is created and indicates this size between 2 KB and 32 KB in the File Allocation Table structure).

4) Repeat step 3 as needed until all bytes of the image data are written to the file system. As each new cluster of data is written, singly-link it from the previous cluster such that the image file can be read in a logically contiguous fashion even if the data clusters are scattered around the media that the file system is stored on.

All file system updates performed by the digital camera host appear as write accesses to the flash storage proxied by the media card storage device. The media card firmware can detect the completion of these sets of operations using a series of heuristics to be compatible with a wide range of implementations of the file system operations in digital still cameras:

1) Wait for a pre-determined amount of time to expire after the time of the last write access to the flash storage by the host device. If more write accesses occur during the timeout period, assume that the host device is continuing to update the file system, reset the timer and keep waiting.

2) Once the timeout expiration occurs, scan the directory structure of the file system and detect if any new files have been created since the last scan by comparing the directory structure against a copy that was saved during the last scan.

3) For each new file that was detected, walk the singly-linked list of data clusters until the end of the list, at which point the number of data bytes stored in the data clusters should match the size of the file as indicated in the Directory Table entry for the file. If the scan terminates early, assume that the expiry timeout during step 1 was too short, invalidate the scan results, increase the timeout and go back to step 1 to allow the host device to complete updating the file system.

If the user chooses to delete any of the images, the camera needs to update the file system information on the storage device. Specifically, the camera:

1) Writes to the Directory Table block for the folder containing the image to be deleted, removing the name and file system information for the file corresponding to the image from the table.

2) Updates the File Allocation Table blocks to mark the data cluster blocks used by the deleted file as free.

The file system update detection mechanism described earlier detects these operations as well, as all file system updates performed by the digital camera host, including file deletions, appear as write accesses to the flash storage. Upon going through the directory structure scan following the update detection, if the media card firmware notices that some files are now missing from the updated scan results, it infers that those files have been deleted from the file system. The firmware locates the physical data blocks in the flash memory that correspond to the deleted files and returns those blocks to the pool of free physical blocks in the persistent database.

In addition to the host camera being able to read and write the storage device, the controller may perform autonomous reads and writes in order to upload digital data to remote computer systems and to delete images or other data. This is performed without knowledge by or cooperation of the host camera in a manner that precludes file system consistency problems or data corruption. For example, in one embodiment of the invention, upon detecting a pre-established criteria (such as a memory utilization threshold being reached, a programmed action or manual intervention by a user), the controller performs the following actions.

First, the controller enumerates the list of files that are candidates for deletion and records the list of sector allocation ranges (clusters) used to store these files. The candidates may be selected according to any of a variety of criteria, for example, they may be the oldest or least recently or frequently accessed files being stored. The cluster information may be stored in a reserved area of memory in the media card.

Second, the controller marks the directory entries for the enumerated files and sets their respective delete flags while locking out the host (e.g., the camera) from accessing the storage array and performs a read/modify/write sequence of the sectors holding the directory entries. At this point, while the storage array is in this modified state, the host may be storing cached copies of the modified sectors and may subsequently overwrite the changes made by the controller as a result of a related or unrelated directory operation. Also, the data storage for the files remains allocated and unmodified (i.e., the images themselves still exist in the storage array).

Third, the controller waits for the host device to be powered down and then powered up again. The new power on cycle can be detected by the host reading the partition table (or master boot record) and FAT boot block (as it is assumed that the host will need to completely replenish its cache after a power-down, power-on cycle). As discussed below, a power cycle of the host and the media card may be distinguished from a power cycle of only the media card by the presence of sector access by the host consistent with file system mounting operations.

Fourth, the controller checks the list of candidate files for deletion and checks to see if the corresponding directory entries are marked deleted. If so, this indicates that the host did not overwrite the changes made above and has now read (cached) the up-to-date version of the directory entries. Any files that have reverted to being not deleted would have lost their read/modify/write of the delete flag due to a write from the cache of the host camera. In the event such files exist (i.e., in the event the files have reverted to the non-delete state), the process returns to step 2 above, and that process is repeated so the delete flags are set. The process then proceeds from step 2.

Fifth, the files with directory entries that are marked deleted by the controller, without involvement of the host, now are no longer present in the enumerated file system, but the corresponding data storage units (e.g., clusters in the FAT) are still allocated. These data storage units are effectively "orphaned" because there are no directory entries pointing thereto, but they are known as lists of ranges (clusters) to the controller since they were recorded in step 1.

Sixth, the orphaned data storage units tracked in steps 1 and 5 and marked as "bad", but they are maintained in the tracking list from step 1. The marking may be performed using a similar read/modify/write semantics (while locking out the host camera) as used in step 2. However, it will not be known whether these modification escape further writes by the host until the next power cycle.

Seventh, the controller waits for another power-down, power-up cycling of the host.

Eighth, the controller iterates through the orphaned data storage units modified in step 6 to determine whether or not the modifications became permanent (i.e., to determine whether or not the host subsequently wrote over the modifications). If the data storage units are still marked as deleted or are now allocated for new files, different than the ones originally tracked in step 1, the deletion candidates are permanently deleted. If, however, the data storage unit allocations have reverted to their previous values, then the process returns to step 5 and is repeated.

Ninth, once the list of files compiled in step 1 has been fully processed in accordance with the above, the list and any other tracking structures are cleared (deleted) and the automatic file deletion process may begin again with a new candidate list.

To better appreciate why the above process is used, consider first that in a system such as a DSC, where a host device makes use of a removable media card or other storage device, that host expects to be the only "master"; that is, the host expects to be the only device which can make changes to the data and/or, the structure of the data stored by the storage device. Consequently, for reasons of performance, user experience, etc. the host will cache portions, often substantial portions, of the data and meta data that makes up the structure of the file system of the storage device. But in a system such as that presented by the present removable media card, where a second controller, of which the host DSC is not aware, can also make changes to the data and meta data stored by the storage device (e.g., to delete portions thereof to make room for new data (images) and/or meta data, for example), there is an inherent risk of creating conflicts between the information cached by the host and the information stored by the storage device, and also of having the host overwrite changes made by the other controller. The present invention provides a method for resolving such conflicts and overwrite situations.

As indicated above, the removable media card or other storage device has a file system. The file system is the means by which the device organizes the information stored in the actual storage media (i.e., the flash memory array or hard disc, etc.). More generally, the file system defines the method of storing and organizing files and the data contained by the files in order to permit the host or other controller to locate and access those files and data. To do so, the file system organizes fixed sized sectors of the storage media into files and directories and keeps track of which sectors belong to which file and which others are not being used. Most file systems, including FAT, exFAT, and others, address data in fixed-sized units called clusters (or blocks) which are made up of a specified number of sectors of the storage media. This is then the smallest amount of physical storage space which can be allocated to store a file. The file system also includes a directory (such as the file allocation table) to associate file names with files stored in the storage media. The present invention is applicable to storage devices employing any of a variety of file systems, including but not limited to FAT and exFAT. FIG. 3 shows an example of a FAT file system 40, but this is merely for purposes of illustration and should not be deemed as limiting the scope of the present invention.

Referring to FIG. 3, the data region 50 of the file system is divided into clusters 52, which as indicated above, are the smallest units of storage in the file system which can be allocated (e.g., 4 kB). Clusters can be any whole number of sectors, typically 1, 2, 4, 8, etc. Stored in the storage media locations represented by the clusters will be the actual user data, for example image data in the case of a DSC. The FAT sector 46 includes mappings identifying the allocation of the clusters in the data region.

Images or other data are assigned file names, for example DSC_0001.jpg, for a JPEG image. The file system stores this file at a location identified by a file name such as, /DSIM/100NCD70/DSC_0001.jpg. This identification (e.g. recorded in root directory region or, in some cases, in the data region if no separate root directory region exists), is a mapping to the location of the file DSC_0001.jpg. The mapping identifies a root level directory, DSIM in this example, which, in turn, points to a subdirectory, 100NCD70, which itself points to the file DSC_100.jpg. The mapping is referred to as a directory structure and it is essentially a series of linked tables with entries pointing to cluster at which the next table or the actual file storing the user data can be found. Within the directory structure, the individual entries include attributes that identify the entry as a file or a directory table, indicators to identify whether or not the entry has been deleted, and a other attributes.

Of course, the individual clusters are relatively small in terms of the actual storage space and so an image, which typically is a relatively large file, will occupy a number of such clusters. This allocation of clusters to files is tracked in the file allocation table in the FAT sector. Each entry in the file allocation table, starting with the entry representing the first cluster storing image data for DSC_0001.jpg, includes either pointer to a next cluster storing image data for that file, or an indicator identifying the associated cluster as being the last cluster in the chain that stores such data. When the camera loads an image, the file system reads the entries in the file allocation table that correspond to the selected image so that the image data from the corresponding cluster locations can be retrieved. Likewise, when a new image is stored to the storage device, the FAT sector is updated to reflect the allocation of clusters to the storage of the new image.

This all has implications for how files must be deleted from file systems. Two things must happen. First, the each cluster in the chain of clusters in the file allocation table that identify the locations at which the subject file (DSC_0001.jpg in the above example) is stored must be marked as "unused" (or some other indication indicating that they are available for reuse). Second, the directory table entry for the subject file must be marked as deleted. These operations must be completed atomically so that there is an assurance they are completed. Usually, the file system will first delete the file entry from the directory table (which essentially makes the file (i.e., the image) unavailable to the host, and then make the file allocation table entries as available. Notice that this process does not involve the user data itself, which often will remain stored in the physical storage media for seine time, until those storage media locations are physically erased or overwritten. Also, if the second operation of marking the file allocation table entries as "available" is not performed, the clusters will remain allocated but the information stored therein will be unavailable and so a net loss of storage space (from the point of view of the host) in the storage device will result. In the context of the present invention, this may, in some instances, be desirable where a "write-once" form of storage device is intended.

The above-described operations are complicated in the context of the present invention because not only is the host camera reading and writing the storage device, so too is the storage device controller, which is responsible for uploading image data to remote computer systems and the like and also for automatically deleting images in order to ensure that storage space is always available for new images (i.e. for providing an "infinite memory" from the standpoint of the host camera). These operations of the storage device controller take place without the knowledge of the host camera, which leads to potential conflicts between the camera's concept of how the storage space is allocated and what information is stored therein and the storage device controller's concept of same.

Figure 4:
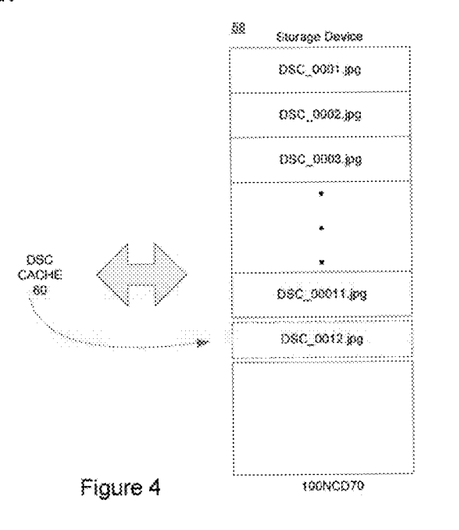
FIG. 4 illustrates an example of a directory table in a storage device's file system in accordance with an embodiment of the present invention.

Referring to FIG. 4, suppose a directory table 58, 100NCD70, in the storage device's file system includes references to various files, DSC_0001.jpg, DSC_0002.jpg, . . . DSC_0011.jpg (representing eleven photos). Suppose further that the camera's cache 60 (assume it is a synchronous write-through cache) stores a copy of this directory table. Absent some reason to reclaim the storage space associated with this block, the camera will assume that this directory table remains unchanged. In the event a new photo is taken (DSC_0012.jpg), the camera will create a new entry in the cached version of the directory table and write the modified directory table to the storage device. The camera need not, however, re-read the directory table from the storage device so long as it maintains its cached version, because the camera assumes it is the only device making modifications thereto.

Of course, this is not the case. The present storage device includes a controller that autonomously uploads images to remote computer systems and/or electronic photo albums and also deletes images from storage in order to make room for new images. These delete operations affect the directory tables, but those effects will be hidden from the camera if the camera retains a previously cached version of those tables. So, for example, if the storage device controller deletes the file DSC_0002.jpg while the 100NCD70 directory table is cached by the camera, that cached version of the directory table (which retains the reference to the deleted file) will be different than the version of the directory table resident on the storage device, but the camera will not know of the differences, nor will it re-read the version of the directory table from the storage device to determine that differences exist. If then the camera tries to retrieve the image file DSC_0002.jpg from the storage device (and note that simply because the camera has cached the directory table that references this image does not mean that it also caches the image itself), a file system error will occur because from the point of view of the storage device there are no directory table or file allocation table entries that point to the image (irrespective of whether the image data still exists in the storage media). Only if the camera undergoes a power-off, power-on cycle and consequently refreshes its cache will the two versions of the directory table again be synchronized. Or, in the above scenario, if the camera did contain a cached version of DSC_0002.jpg, the user may be fooled into believing the image exists (because he/she can view it on the camera, but when the user tries to recover it from the storage device, it will be gone.

Further errors are also possible. For example, assume the camera has stored DSC_0012.jpg and written the modified directory table to the storage device, and the storage device controller has subsequently deleted DSC_0002.jpg. Now assume that the camera captures a new image, DSC_0013.jpg. As before, this results in the cached version of the directory table being updated to include a reference to the new image file, and this modified version the directory table will be written to the storage device. But this version of the directory table includes a reference to DSC_0002.jpg, the very file that was deleted by the storage device controller. The actions of the camera have overwritten those of the storage device controller. Further, if the camera did not also cache the file allocation table portions relating to DSC_0002.jpg, then the result will be that the storage device will contain a directory table entry for DSC_0002.jpg, but no file allocation table entry therefor (the previous version would have been modified to indicate the clusters associated with DSC_0002.jpg were available), and again file system errors result. Of course, similar kinds of errors can result if the camera caches file allocation table entries and the storage device is deleting files. Indeed, this can lead to situations where the camera overwrites the file allocation to indicate that clusters in the data region are allocated, but there are no actual files there because the storage device controller has deleted them. In other words, storage space is allocated, but not actually used, and so the effective storage space of the device has been reduced.

To contend with issues such as those discussed above, the present invention relies upon synchronization "barriers", past which the storage device controller can be assured that the host camera's understanding of the storage device's file system (e.g. as represented in the camera's cache) is the same as (i.e., is synchronized with) the storage device controller's understanding of the file system (i.e., that the state of the two devices with respect to the storage device file system is the same). Nominally, this is a camera power cycle (i.e. power-off, power-on of the host camera), although with some cameras the state of the cache may persist across power cycles and so in some implementations it may be necessary to wait for a power cycle in conjunctions with an observed (by the storage device controller) read (by the host camera) of the master boot record and the file system information to be assured that the camera's cache contents are being completely reinitialized. In other implementations, different observed criteria may be available to determine when the file system is mounted by the host and this then could be used as the synchronization barrier condition.

Figure 5:
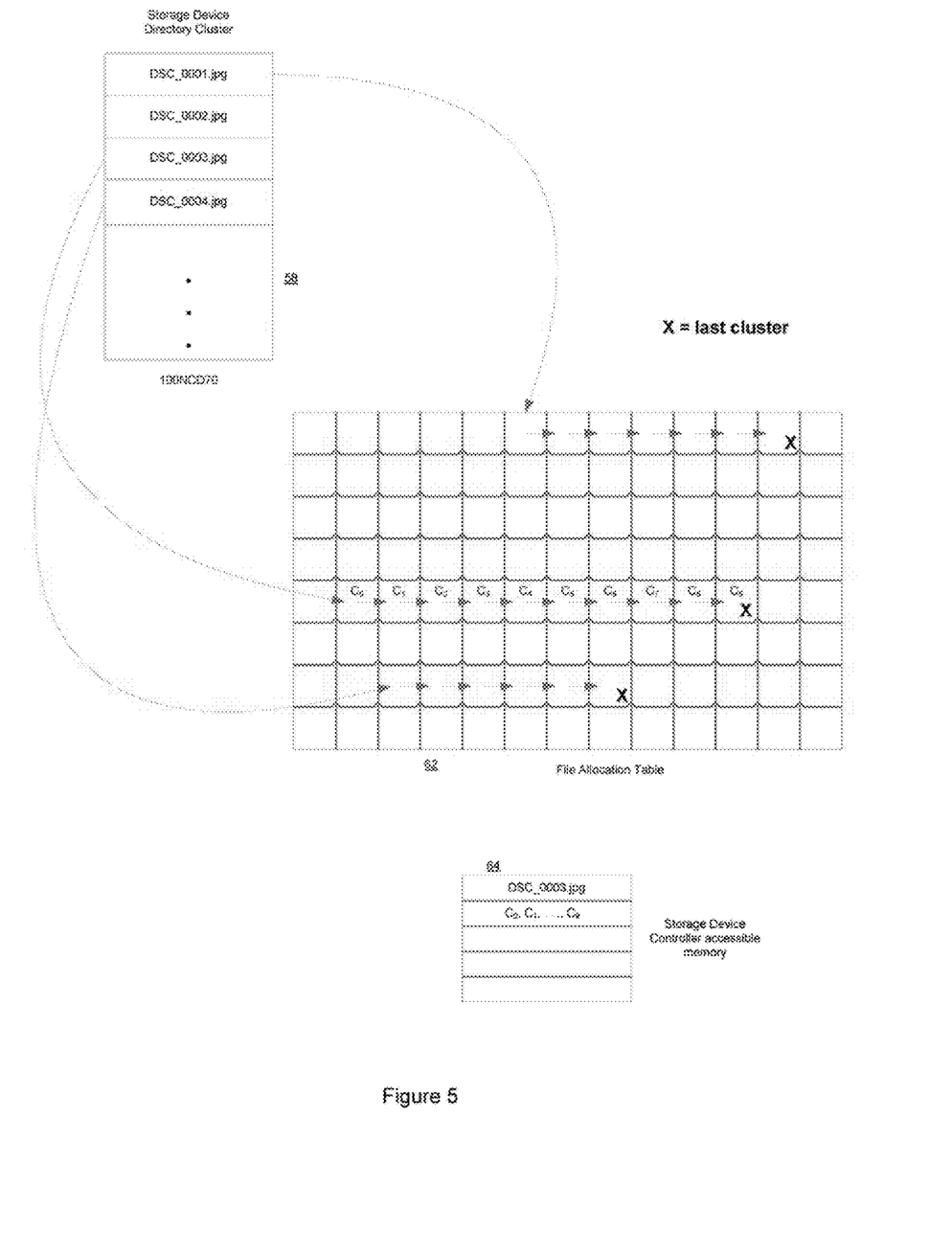
FIG. 5 illustrates an example of a directory table with pointers to a file allocation table in accordance with an embodiment of the present invention.

Referring to FIG. 5, an example of a directory table 58 with pointers to a file allocation table 62 is indicated. The file allocation table includes the linked lists of entries that establish where in the data region the actual image data is stored. The directory table 58 is stored in a cluster, for example in the data region of the file system. Assume that the storage device controller has determined that the file DSC_0003.jpg should be deleted to make room for new images (e.g., either because a threshold for the amount of used storage space has been reached or some other deletion criteria has been met).

Figure 6:
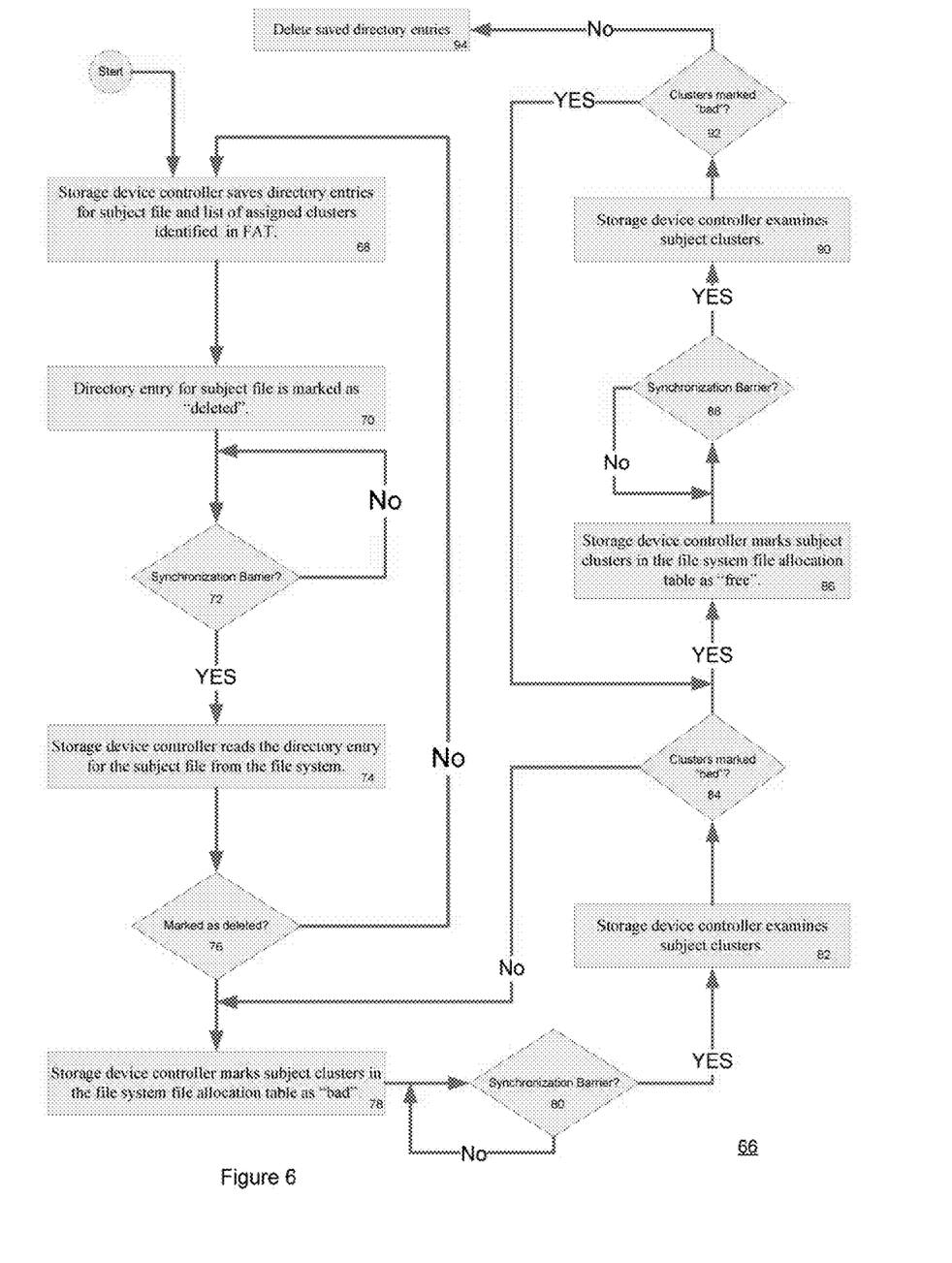
FIG. 6 illustrates an example of a process for deleting one or more files from a storage device's file system to make room for new files (e.g., images) in accordance with an embodiment of the present invention.

The first step in the process 66 (which is shown in FIG. 6) is for the storage device controller to save (e.g., in an area of memory 64 outside of the file system and accessible to the storage device controller) the directory entry for the subject file (DSC_0003.jpg), some attributes thereof (e.g., where the directory entry was stored in the file system), and a list of the clusters identified in the file allocation table that are assigned to storage of the subject file (step 68). In this example these are clusters $C_0$-$C_9$. This storage will allow for later checking for consistency across synchronization barriers (which for purposes of explanation in this example will be power cycles of the host but may in other instances be other events, as discussed above). Once this information has been recorded, the directory entry for the subject file is marked as "deleted" (step 70) and the process waits for a synchronization barrier (e.g., host power-off, power-on) (step 72).

Once a synchronization barrier is observed, the storage device controller reads from its memory storage area to obtain the file system address for the directory entry of the subject file (step 74) and, using that information, reads the directory entry at that location in the file system. If what is read indicates that the file is not deleted, this is an indication that the host overwrote the changes made by the storage device controller and so the controller starts the process anew (step 68).

If, however, the directory entry from the file system is marked as deleted (step 76), this is an indication that the camera did not over write the modifications and, because a synchronization barrier was crossed (meaning that the camera remounted the file system), the storage device controller can be assured that the camera's cache will not contain a directory table entry for the subject file.

At this point, the file allocation table still contains clusters allocated for the subject file, but there is no directory entry in the file system pointing to this set of clusters. So, the storage device controller reads the previously stored list of clusters allocated to the subject file from memory, and marks those clusters in the file system file allocation table as "bad" (step 78). This is a bit encoding that instructs the file system (and, therefore the host, that these clusters should not be used for storing information). The storage device controller then waits for another synchronization barrier (step 80). Note that the clusters are not simply marked "free" at this point because it is possible that a cache collision with the host may result in some of the modifications taking effect (across a synchronization barrier) and others not taking effect (due to being over written by a cache write from the camera), which would yield a file system error (e.g. clusters would be allocated, but no directory entry would point to those clusters; or, more insidious, the camera may have written new image data to the "free" clusters and the storage device controller would be incapable of distinguishing between the "old" image data and the "new" image data, absent doing a complete scan of the entire file system to look for a directory entry pointing to the clusters assigned to the "new" image).

To avoid these difficulties, the clusters are marked as "bad" and the storage device controller awaits another synchronization barrier. Upon detecting same (step 80), the storage device controller again obtains the list of clusters for the subject file from memory and examines each such cluster to determine whether or not it is presently marked as "bad" (step 82). If any of the clusters are not marked as "bad" (step 84) (indicating a cache collision with the host camera), the process reverts to the previous step (step 78) and the storage device controller marks the clusters as "bad". Optionally, one could mark all of the original clusters again, or just mark the clusters that had changed state and were no longer marked as "bad".

If, however, all of the clusters previously allocated to the subject file are marked as "bad", this is an indication that the modifications from the previous step have taken effect and because the host has remounted the file system, the state of the host's cache is assured of being synchronized with the file system as observed by the storage device controller. Accordingly, the storage device controller now marks the subject clusters as "free" or "available" (step 86), meaning that they are available for storing new data.

The storage device controller now needs to verify that this change has taken effect, so it again waits for another synchronization barrier (step 88). Upon detecting same, the storage device controller again obtains the list of clusters for the subject file from memory and examines each such cluster (step 90) to determine whether or not it is presently marked as "bad" (step 92). If any of the clusters are marked as "bad" (indicating a cache collision with the host camera), the process reverts to the previous step (step 86) and the storage device controller marks the clusters as "free". Optionally, one could mark all of the original clusters again, or just mark the clusters that had changed state and were marked "bad". If, however, all of the clusters previously allocated to the subject file are not marked as "bad", this is an indication that the modifications from the previous step have taken effect and because the host has remounted the file system, the state of the host's cache is assured of being synchronized with the file system as observed by the storage device controller. Accordingly, the storage device controller has successfully completed the deletion of the subject file and can delete the previously saved list of clusters and directory table information from memory (to prevent repeating the deletion cycle with respect to this file) (step 94). Note that this process may be performed for multiple files in parallel, and even for files in different states of the deletion process.

In connection with the above description, it should be recognized that the storage device controller has a very small cache and so when the controller makes any of the modifications discussed above, it usually will involve a read-modify-write cycle (because the information likely is not present in the controller's cache). The sector data must be read, then modified, then written back. These operations take time, so to prevent these operations from colliding with operations which the camera might be engaged in (e.g., writing new image data to the storage device), which operations would be over written when the storage device controller writes through to the file system, the storage device controller locks out the host for the brief period of time that the controller is engaged in the read-modify-write operation. The camera operations are therefore guaranteed to come prior to any controller writes (in which case the controller cache would load the same version of the file system information as the camera cache stores, or to come after the controller writes (thus over writing the controller's modifications, but which over writing the above described procedure is deigned to accommodate), but not during the controller operations. To ensure that no camera data is lost, the controller buffers any writes from the camera during this lock out period.

Above it was mentioned that the controller may initiate the above-described process in response to a triggering event. The triggering event may be a confirmation of a successful transfer of image data off of the storage device to a remote computer system or electronic photo album, or such confirmation in combination with a threshold level of storage device space being reached. The threshold level may be user-definable (e.g., as a setting made by the user when specifying other settings for the controller such as wireless network parameters, account names and passwords for electronic photo albums, etc.) or may be a pre-established threshold.

Figure 7A:
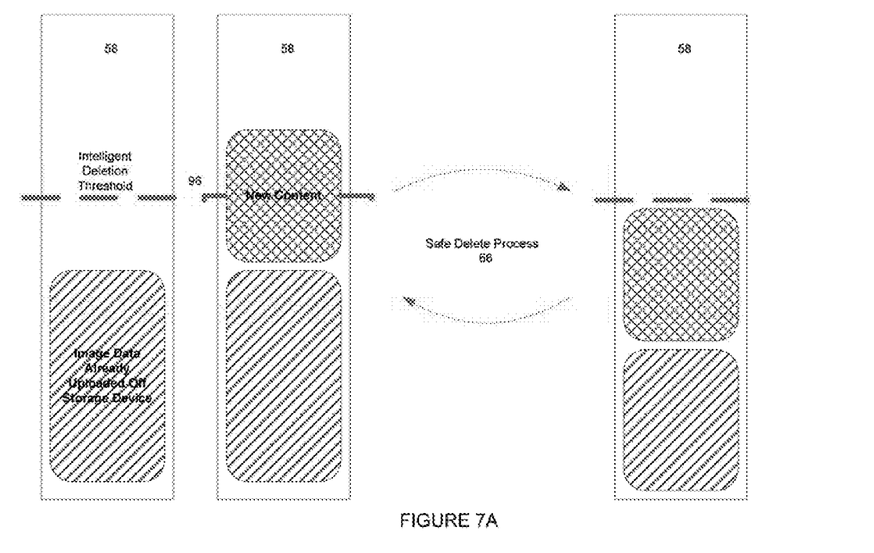
FIGS. 7A and 7B illustrate examples of deletion of content from a storage device in response to a triggering event in accordance with an embodiment of the present invention.
Figure 7B:
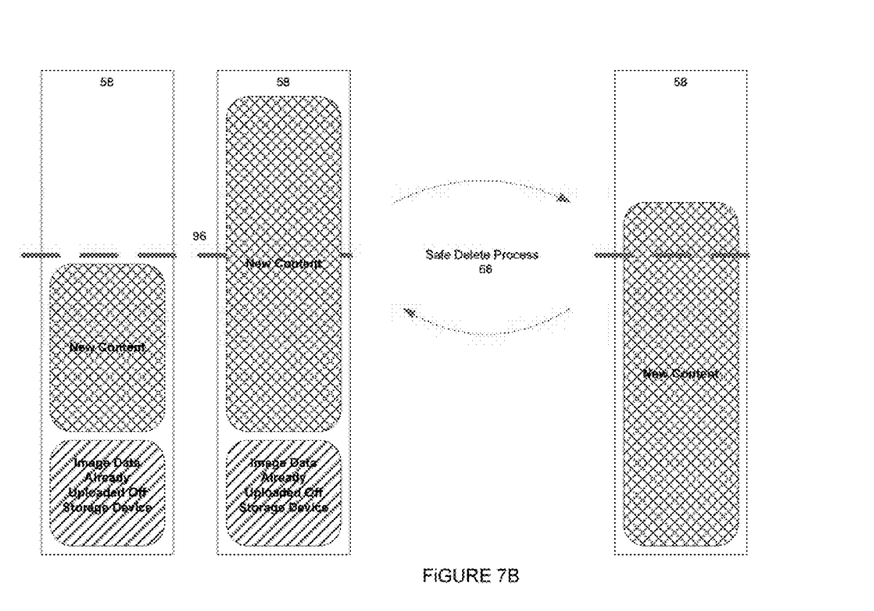

The deletion of content may continue until a designated amount of storage space is made available (which may be a different threshold from that used to trigger the deletion process). Deletion should not, however, involve files that have not been uploaded from the storage device, unless a user affirmatively indicates that such files should be deleted, so as to prevent the loss of images, etc. FIGS. 7A and 7B illustrate examples of the above. In FIG. 7A, image data is saved on the storage device 56, even if already uploaded to off-device storage, until a threshold 96 is exceeded due to the storage of new content. At that time, a sufficient amount of previously off-loaded content is deleted from the storage device (using the process 66 discussed above) so that the total amount of information stored on the storage device is less than the threshold amount. In FIG. 7B, it is seen that where the amount of new content stored on the storage device exceeds the threshold 96, the content is nevertheless stored until it can be off-loaded from the storage device. Files may be deleted in first-in-first-out order or in other fashion (e.g., a user-definable fashion or a least recently viewed fashion, etc.) and, in some cases, deletion may continue until a deletion threshold for the storage device has been reached, a fixed number or percentage of files stored in the storage device have been deleted, or a designated percentage of storage space in the storage device has been made available for storing new files, etc.

Thus, methods and systems for autonomously deleting content from storage media of storage devices have been described. Although discussed in the context of a storage device for use with a host, the present invention is applicable to any host-storage device combination. Moreover, the above-described process for deleting content from the storage device could be operated in a reverse order to safely move content onto the storage device via the storage device controller, without interfering with the operations of the external host. For example, the controller could seek out a sufficient number of free clusters within which to store the new information, mark those sectors as "bad", and await a synchronization barrier. Once these modifications were confirmed, the storage device controller could create the file allocation table linkages between the clusters, and await a further synchronization barrier. Thereafter, assuming the linkages were verified across a synchronization barrier, the new content could be downloaded onto the storage device and stored in the storage space that corresponds to the reserved clusters. Of course, this may take time across several synchronization barriers for a large file, as the contents would need to be verified across synchronization barriers. Once all the data was verified as being stored in the reserved clusters, the storage device controller would create the directory table entries to point to the beginning of the new cluster allocations.

In further embodiments, there may be a period of time after power on that the camera does not mount the file system of the storage device and so the storage device controller can freely read and write the file system without having to ensure that the camera cache is synchronized. This period would end when the controller observes the host mounting the file system of the storage device.

Of course, the present invention is not limited to FAT or exFAT file systems and can be used in connection with any file system that maintains structures similar to those of FAT and exFAT.

What is claimed is:

1. A method of autonomous operation of a storage device controller, comprising:
   upon detecting a triggering event, a controller of a storage device enumerating a list of files that are candidates for deletion from storage media of the storage device, said storage media communicatively coupled to the controller, and recording a list of sectors of the storage media used to store the candidate files;
   marking storage device file system directory entries for the list of enumerated files as deleted while locking out a host device for the storage device from accessing the storage media, and performing a read/modify/write sequence of those sectors of the storage media holding the directory entries;
   waiting for a first host device synchronization event;
   upon recognizing the first host device synchronization event, checking the list of candidate files for deletion and determining whether corresponding directory entries of the candidate files are marked deleted;
   if the directory entries of the candidate files are not marked deleted, repeating the marking of directory entries as deleted, performing the read/modify/write of the sectors of the storage media holding the directory entries, and waiting for an additional first host device synchronization event; otherwise, if the directory entries of the candidate files are marked deleted, then marking orphaned sectors to prevent data storage to corresponding data storage units in the storage media but maintaining the orphaned sectors in the list of sectors, wherein the orphaned sectors are those sectors with corresponding directory entries that are marked as deleted but with corresponding data storage units in the storage media still allocated;
   waiting for a further host device synchronization event and, upon recognition of same, iterating through the orphaned sectors to determine whether or not the host device subsequently wrote over the read/modify/write actions; and
   if the orphaned sectors have reverted to a previous value, then repeating the marking of the orphaned sectors, waiting for the further host device synchronization event and determining whether or not the host device subsequently wrote over the read/modify/write actions, otherwise, if the orphaned sectors are still marked, allocating the list of sectors as being available to store new data and clearing the list of candidate files.

2. The method of claim 1, wherein the triggering event comprises an indication that a storage media utilization threshold has been reached or exceeded.

3. The method of claim 1, wherein the triggering event comprises a programmed action.

4. The method of claim 1, wherein the triggering event comprises a manual intervention by a user of the host device.

5. The method of claim 1, wherein the candidate files are the oldest files stored in the storage media.

6. The method of claim 1, wherein the candidate files are the least recently accessed files stored in the storage media.

7. The method of claim 1, wherein the candidate files are the least frequently accessed files stored in the storage media.

8. The method of claim 1, wherein the sector information is stored in a reserved area of the storage media.

9. The method of claim 1, wherein the first host device synchronization event comprises a power-down-then-power-up cycle of the host device.

10. The method of claim 9, wherein the first host device synchronization event is determined by the controller detecting the host device reading a partition table or master boot record and file allocation table (FAT) boot block.

11. The method of claim 9, wherein the first host device synchronization event is distinguished from another event by the controller recognizing a host device access of a file system of the storage device consistent with file system mounting operations.

12. The method of claim 1, wherein the orphaned sectors are marked using read/modify/write semantics while the host device is locked out from accessing the storage device.

13. The method of claim 1, wherein deletion processes are repeated until at least one of the following criteria is met: a deletion threshold for the storage device has been reached, a fixed number or percentage of files stored in the storage device have been deleted, or a designated percentage of storage space in the storage device has been made available for storing new files.

14. A storage device comprising a controller communicatively coupled to a host device interface and a storage media, said controller configured to, upon detecting a triggering event, enumerate a list of files that are candidates for deletion from the storage media, and record a list of sectors of the storage media used to store the candidate files; mark storage device file system directory entries for the list of enumerated files as deleted while locking out a host device coupled to the host device interface from accessing the storage media, and perform a read/modify/write sequence of those sectors of the storage media holding the directory entries; wait for a first host device synchronization event, and upon recognizing the first host device synchronization event check the list of candidate files for deletion and determining whether corresponding directory entries of the candidate files are marked deleted; if the directory entries of the candidate files are not marked deleted, repeat the marking of directory entries as deleted, perform the read/modify/write of the sectors of the storage media holding the directory entries, and wait for an additional first host device synchronization event; otherwise, if the directory entries of the candidate files are marked deleted, then mark orphaned sectors to prevent data storage to corresponding data storage units in the storage media but maintain the orphaned sectors in the list of sectors, wherein the orphaned sectors are those sectors with corresponding directory entries that are marked as deleted but with corresponding data storage units in the storage media still allocated; wait for a further host device synchronization event and, upon recognizing same iterate through the orphaned sectors to determine whether or not the host device subsequently wrote over the read/modify/write actions; and if the orphaned sectors have reverted to a previous value, then repeat the marking of the orphaned sectors, wait for the further host device synchronization event and determine whether or not the host device subsequently wrote over the read/modify/write actions, otherwise, if the orphaned sectors are still marked, allocate the list of sectors as being available to store new data and clear the list of candidate files.

15. The storage device of claim 14, wherein the storage device comprises a media card and the host interface comprises a digital camera interface.

16. The storage device of claim 14, wherein the triggering event comprises one of; an indication that a storage media utilization threshold has been reached or exceeded, a programmed action, or a manual intervention by a user of the host device.

17. The storage device of claim 14, wherein the candidate files are one of: the oldest files stored in the storage media, the least recently accessed files stored in the storage media, or the least frequently accessed files stored in the storage media.

18. The storage device of claim 14, wherein the first host device synchronization event comprises a power-down-then-power-up cycle of the host device.

19. The storage device of claim 14, wherein the controller is configured to recognize the first host device synchronization event by recognizing a host device access of a file system of the storage device consistent with file system mounting operations.

20. The storage device of claim 14, wherein the controller is configured to perform deletion processes until at least one of the following criteria is met: a deletion threshold for the storage device has been reached, a fixed number or percentage of files stored in the storage device have been deleted, or a designated percentage of storage space in the storage device has been made available for storing new files.

* * * * *